3,281,458
N-ALKYL AMMONIUM HUMATES
John W. Jordan and Michael J. Nevins, Houston, Tex., Robert O. Stearns, Barstow, Calif., and Jack C. Cowan and Augustus Earl Beasley, Jr., Houston, Tex., assignors to National Lead Company, New York, N.Y., a corporation of New Jersey
No Drawing. Filed Mar. 11, 1965, Ser. No. 439,066
4 Claims. (Cl. 260—501)

This application is a continuation-in-part of our copending application Ser. No. 95,793, filed March 15, 1961, now abandoned.

This invention relates to novel organic derivatives of humic acid, and more particularly to certain long-chain ammonium salts of humic acid.

Humic acid is a material of wide distribution, being present in soils, peat, and coals, especially coals of the type known as lignite or brown coal. Although the exact details of its chemical structure are not completely known, it is a surprisingly uniform substance considering the variety of source materials of which it represents a natural product of degradation, such as leaves, wood, and like vegetable organic matter. It is an acid, in which both carboxyl and phenolic hydroxyl groups contribute base-combining ability. It is soluble in alkalies, such as caustic soda and sodium carbonate, has a deep brown color, and is readily soluble in water when converted to its alkali metal salt, which may be then termed an alkali metal humate, the commonest example of which is sodium humate.

As indicated, it is present in soils and peat, and may readily be extracted from these by known means, most commonly by treatment with dilute aqueous alkali. Whenever it is a matter of producing a commercial humate, that is, whenever economic considerations are of importance, then the humic acid is nearly always derived from its richest common source, which is lignite, of which there are vast deposits distributed throughout the world, including the United States, and particularly the states of North Dakota, Texas, New Mexico, and California.

Lignite is indeed such an inexpensive commodity that its widest use is as a fuel. However, extraction of its alkali-soluble portion, termed the humic acid fraction, results in a material of considerable usefulness in technology. Humic acid and its common salt, sodium humate, are, for example, useful as dispersants in aqueous systems, such as clay-water systems. Again, these materials are widely used as inexpensive dyes in the paper art. They find application as components of lead storage battery plates, and diverse other uses are known. However, the generally known commercial uses of humates are in aqueous systems, which eliminates large areas of chemical technology as fields for the possible employment of humates.

An object of the present invention is to produce derivatives of humic acid which are useful in non-aqueous systems.

Another object of our invention is to produce derivatives of humic acid which disperse in oily systems and impart infiltrability thereto.

Other objects of the invention will appear as the description thereof proceeds.

Generally speaking, and in accordance with illustrative embodiments of our invention, we produce a salt of humic acid, viz., a humate, in which the cation is a substituted ammonium ion, the said cation corresponding to one of the following: a mono-long-chain primary amine; a di-long-chain secondary amine; a di-long-chain, mono-short-alkyl tertiary amine; a tri-long-chain tertiary amine; a di-long-chain, di-short-alkyl quaternary amine; a tri-long-chain, mono-short-alkyl quaternary amine; and a tetra-long-chain quaternary amine.

In the above characterization, the term "long chain" refers to an alkyl chain having from 12 to 22 (inclusive) carbon atoms; while the term "short-alkyl" refers to any of the radicals: methyl, ethyl, propyl. Also in the foregoing, the ordinary commercial nomenclature is used in describing these substituted ammonium cations as "amines." It will be understood that primary, secondary, and tertiary amines are formed into cations by acquisition of a hydrogen, so that the cation formed from, for example, primary octadecylamine, is, properly speaking, octadecylammonium ion; and similarly for the others. The "quaternary amines" are properly quaternary ammonium ions in salt formation in accordance with our invention.

Accordingly, it will be apparent from the foregoing that the substituted ammonium humate in accordance with our invention corresponds to the formula:

$$R_1R_2R_3R_4N^+Hu^-$$

where $R_1$ is $C_{12}-C_{22}$ alkyl when $R_2$, $R_3$ and $R_4$ are all H; and
where $R_1$ and $R_2$ are $C_{12}-C_{22}$ alkyl when $R_3$ and $R_4$ are chosen from the group consisting of H, $CH_3$, $C_2H_5$, $C_3H_7$, and $C_{12}-C_{22}$ alkyl.

In the foregoing, as indeed elsewhere in this specification and the claims which follow, the term "$C_{12}-C_{22}$ alkyl" is to be understood as including unsaturated alkyl chains as well, for example, oleyl as well as stearyl. This nomenclature is in accordance with common industrial usage: see, for example, "Surface Active Agents" by A. M. Schwartz and J. W. Perry, New York, 1949, page 126. The significance of "$C_{12}-C_{22}$" is of course that the alkyl chain in question may have anywhere from 12 carbon atoms, as in lauryl, to 22 carbon atoms, as in behenyl. "Hu$^-$" is the humate ion.

By way of further explanation of the nature and types of the alkyl ammonium humate compounds which we use in our invention, we give the following table showing some typical members of the series, although these are merely illustrative and not at all by way of limitation.

TABLE I

Dodecylammonium humate
Stearylammonium humate
Oleylammonium humate
Docosylammonium humate
Di-dodecylammonium humate
Laurylstearylammonium humate
Methyllaurylstearylammonium humate
Tri-laurylammonium humate
Dimethyldioctadecylammonium humate
Dimethyldi-(hydrogenated tallow fatty alkyl) ammonium humate
Methyltrilaurylammonium humate
Methyltri-(hydrogenated tallow fatty alkyl) ammonium humate Generally speaking, the compounds of our invention may be produced by bringing together humic acid and the selected alkyl ammonium compound in its base form. The base and the acid neutralize each other with salt formation, so as to produce an alkyl ammonium humate in accordance with the invention. Another general method of preparation is to convert the humic acid to a simple salt by reaction with an alkali, so as to produce sodium humate, potassium humate, ammonium humate, and the like, by reaction with sodium hydroxide, potassium hydroxide or ammonium hydroxide respectively. The alkyl ammonium compound is caused to be present in the form of a simple salt. Thus, a primary, secondary, or tertiary amine may be reacted with a simple acid such as hydrochloric, acetic, and the like to give the corresponding substituted ammonium chloride or acetate, respectively. The method of procedure has the advantage that the simple substituted ammonium salts, and the simple humates as described, are both water soluble, so that solutions of each reactant may be made, and the reaction completed by mixing the solutions together. To give a simple example, octadecyl amine is treated with an equivalent quantity of acetic acid to give octadecylammonium acetate. This is then dissolved in several times its weight in water. Separately, humic acid is converted to sodium humate by treating lignite, for example, with sodium hydroxide to neutrality followed by filtering off the insoluble portion of the lignite. The solution of sodium humate thus formed is mixed with the solution of octadecylammonium acetate in stoichiometrically equivalent proportions, whereupon there occurs a quantitative precipitation of octadecylammonium humate. The equivalent weight of the humic acid can readily be determined in any known fashion applicable to acids generally, such as, for example, by titration of sodium hydroxide using an electrometric pH meter.

A somewhat special case is presented by the quaternary substituted ammonium salts, which have no free base form. A simple example is dimethyl dioctadecylammonium chloride. In its quaternary salt form, it is already available for reaction with an alkali humate such as sodium humate, and it may also be reacted directly with humic acid, although the reaction is accelerated by adding some base such as sodium hydroxide to the reaction mixture to neutralize the acid which is formed as a result of the reaction, which in the particular example considered here would be hydrochloric acid. The quaternary ammonium compounds may be in their hydroxide form, of course, and may then be reacted directly with humic acid.

The reaction methods just described are general, and are of general application except that in some cases the reaction does not always go to completion or proceed as rapidly as desired because of the physical state of the reactants, and we wish it to be understood that we contemplate that those practicing the invention will take into account the known methods of accelerating and especially of bringing to completion reactions of the type under consideration here. We shall note herein sufficient of such methods so as to enable anyone skilled in the art and desiring to practice the invention to do so, with any and all combinations of reactants within the purview of our invention.

Thus, for example, it is possible to select naturally occurring lignites which are nearly completely humic acid. If these are ground to, say, the fineness of passing a 200 mesh screen, and then mixed with an alkyl amine of the type described, our novel compounds will indeed be formed for a certain depth into each of the microscopic particles of lignite, but the very reaction product thus formed will considerably retard the penetration of additional amine into the interior of the lignite particle, so that unduly long times will be required for completing the reaction. This, of course, is elementary chemistry. If the reaction mixture just described is treated mechanically, so as to expose fresh portions of unreacted lignite, such as by the use of a paint mill or colloid mill, the reaction can be completed in a practicably short time. It will be apparent, therefore, that some methods of procedure are faster than others and therefore to be preferred, although in teaching the more preferable methods we do not wish to exclude the less preferable reaction conditions, combinations and the like. The best method that we know, generally speaking, is to make each of the reactants available in its salt form as hereinbefore described, and to react the two salts together in their aqueous solutions, whereby the reaction product is recovered as a precipitate and may be washed free of the simple salt which is a by-product of the reaction.

We will now give a working example of our invention, which at the same time will serve to show the best method that we know for carrying it out.

Example 1

100 grams (dry weight) lignite from Bowman County, North Dakota, characterized by a solubility of 85% (dry weight) in sodium hydroxide solution, was added to one liter of water and 30 grams of sodium hydroxide added. The solution was allowed to stand overnight with occasional stirring. The next day the pH was adjusted to 7.0 with sulfuric acid, and the supernatant liquid was decanted from the precipitate, which had a dry weight of about 15 grams. Separately, 90 grams of dimethyldioctadecylammonium chloride were dissolved in 200 cc. of water, and this solution was added to the decanted sodium humate solution resulting from the first step. A flocculent precipitate of dimethyldioctadecylammonium humate formed, which was separated by filtration on filter paper and washed with about 200 cc. of distilled water. The product was dried in a dessicator over calcium chloride, and ground in a mortar to pass a 60 mesh screen. The reaction product was dispersible and soluble in organic solvents, e.g., benzene.

The example just given shows the production of a quite pure product, free of the small amount of ash which is present in most lignite. For some purposes, it is not necessary to make such a pure product, and we give a second working example which produces a useful product as somewhat lower processing costs:

Example 2

120.5 grams of the lignite described in Example 1 above, and containing 17% moisture, were mixed with 46.5 grams water, 15.5 grams of dimethyldioctadecylammonium chloride, and 8 grams of sodium hydroxide, and ground together with a mortar and pestle for three minutes. A product resulted which was useful as a dispersing agent in oleophilic systems.

Example 3

The reaction product of Example 2 was mixed in its entirety with 200 cc. of diesel oil in a Waring Blendor for 10 minutes. This produced a concentrated dispersion of dimethyldioctadecylammonium humate in the diesel oil. This was useful in preparing oil-base drilling fluids and oil-base fracturing fluids of the type used in fracturing oil-bearing formations in order to increase the permeability thereof. For example, when the concentrate described was added to an additional quantity of diesel oil, in the proportions of 5 grams of the concentrate and 350 cc. of the diesel oil, a fluid was produced which when tested for fluid loss in accordance with the specifications of the American Petroleum Institute, Code No. 29, gave a 30 minute fluid loss of 2.6 cc., which is exceptionally low considering the low concentration of the additive present.

All of the products described, as already mentioned, are dispersible in organic systems, and are useful as dispersing agents, for example, in dispersing finely grounded minerals in organic liquids, in the formulation of printing inks, in improving the dispersion of pigments in paints, and the like.

We have found that the reaction of the organic bases with humic acid results in the formation of a normal salt, with the stoichiometrically equivalent quantities of the components entering thereinto. This is not to imply that only exactly stoichiometrically equivalent quantities may be used in practising our invention. For example, if an excess of the base is used, then in addition to the alkyl ammonium humate which forms, some unreacted base will be present intermixed therewith; while if an excess of humic acid is used, the latter will be present as a diluent of the alkyl ammonium humate produced. The material which is active, however, in the practice of our invention, is the alkyl ammonium humate as produced in accordance with the invention, and that is what we have accordingly recited in the claims which follow.

As will be clear from the foregoing, alkyl ammonium humates which are outside of the scope of the present invention comprise, among others, secondary, tertiary, and quaternary amines possessing only one long chain. Thus, outside of the scope of this invention are such particular compounds as methyloctadecylammonium humate; di-methyllaurylammonium humate; and tri-methylactadecylammonium humate. Likewise, outside of the scope of this invention are ring compounds such as substituted pyridinium humates and substituted imidazolinium humates, even though the heterocyclic ring may bear a long chain radical such as lauryl, stearyl, or the like. The compounds of our invention form a particular group with quite special properties which are sharply distinguished from compounds outside of the group including those just mentioned. We are unable to offer any explanation based on considerations of theoretical organic chemistry as to why there should exist such a sharp cleavage between the two groups of substituted ammonium humates. Extensive experiments have nevertheless shown that these sharp differences exist. Thus, there are given below test data for a number of compounds, some included within the scope of our invention and others outside of it, showing the ability of the compound (1) to disperse in toluene, (2) to impart low fluid loss to an invert emulsion drilling fluid made with diesel oil, and (3) to reduce the filtrability of emulsion fluids prepared with naphthenic oil and water. The test results are given in Table II which follows. In the tabulation, compounds within the scope of the invention are preceded by a capital "I," while those outside of the scope of the invention are preceded by a capital "O." Dispersibility in toluene was determined by stirring 10 grams of the compound in 200 cc. of toluene for 10 minutes, and then permitting the solutions to stand for 16 hours. Dispersibility was evident by a black color remaining, while nondispersibility was indicated by the compound settling out and leaving a relatively clear supernatant layer of toluene. Dispersibility and nondispersibility are indicated in Table II by a plus (+) and a minus (−) sign respectively. The invert emulsion drilling fluid was prepared by dispersing 15 grams of the compound in 210 cc. of No. 2 diesel oil with 5 minutes stirring on a laboratory mixer, adding 140 cc. of water, and stirring for 10 additional minutes. The fluid loss was then determined in accordance with the method standardized by the American Petroleum Institute. The fluid loss in cubic centimeters is given in Table II; a high fluid loss is unsatisfactory, while a low fluid loss is what is desired. The emulsion fluids prepared with a naphthenic base oil were made with the same proportions of ingredients and same procedure as used in the invert emulsion drilling fluids just described. Here again, filtrate values in accordance with the American Petroleum Institute are given; high values are bad, while low values are good.

TABLE II

| | Quaternary Amines | Dispersibility in Toluene | Filter Loss, Invert Emulsion Drilling Fluid | Filter Loss, Naphthenic Emulsion |
|---|---|---|---|---|
| I | Tri-hydrogenated tallow methyl ammonium chloride | Plus | 5.5 | 5.4 |
| I | Distearyl di-methyl ammonium chloride | do | 4.4 | |
| I | Di-tallow di-methyl ammonium chloride | do | 5.4 | 9.0 |
| I | Di palmityl di-methyl ammonium chloride | do | 7.0 | |
| I | Di myristyl di-methyl ammonium chloride | do | | |
| I | Di lauryl di-methyl ammonium chloride | do | | |
| | Methyl-behenyl tri-methyl ammonium chloride | Minus | [2] 52 | |
| | Stearyl tri-methyl ammonium chloride | do | [2] 136 | |
| | Palmityl tri-methyl ammonium chloride | do | [1] 125 | |
| | Cetyl tri-methyl ammonium chloride | do | [2] 164 | [3] 1 |
| | Myristyl tri-methyl ammonium chloride | do | [1] 90 | |
| | Lauryl tri-methyl ammonium chloride | do | [1] 216 | |
| | *Tertiary Amines* | | | |
| I | Tri-hydrogenated tallow amine | Plus | 0.5 | 6.4 |
| | *Secondary Amines* | | | |
| I | Di-stearyl amine | do | 1.0 | 5.5 |
| | *Primary Amines* | | | |
| I | Stearyl amine | do | | |
| I | Palmityl amine | do | | |
| I | Myristyl amine | do | | |
| I | Lauryl amine | do | | |
| | *Rings* | | | |
| O | Cetyl pyridinium chloride | Minus | [2] 148 | [4] 100 |

[1] Filter loss in thirty seconds.
[2] Filter loss in one minute.
[3] Filter loss in two minutes.
[4] Filter loss in five minutes.

The standard American Petroleum Institute filter test calls for a thirty-minute filtration, and where not otherwise designated, the figures in Table II for filter loss are that period of time. Where a given preparation has a very high filter rate, the apparatus does not contain a sufficient quantity to carry out a thirty-minute test, so that in many cases the run will be terminated after one or two minutes. The filtrate collected in such a case is shown in Table II, and an asterisk beside the figure indicates periods of time in accordance with the footnote.

It will of course be understood that the first column of Table II lists the amines used to prepare the respective alkyl ammonium humates; the latter are the actual compounds used in the tests, the results of which appear in the other columns of Table II.

While we have illustrated our invention by the use of specific ingredients, reaction conditions, and the like, it will be understood that numerous variations, equivalents, and alternatives may be employed in its practice, all within the scope of the claims which follow.

Having described our invention, we claim:

1. A salt of humic acid in which the cation is a substituted ammonium ion, the said cation being selected from the group consisting of a mono-long-chain primary amine; a di-long-chain secondary amine; a di-long-chain, mono-short-alkyl tertiary amine; a tri-long-chain tertiary amine; a di-long-chain, di-short-alkyl quaternary amine; a tri-long-chain, mono-short-alkyl quaternary amine; and a tetra-long-chain quaternary amine; and wherein the term "long chain" is an alkyl chain having from 12 to 22 inclusive carbon atoms; and wherein the term "short alkyl" is any of the radicals: methyl, ethyl, propyl.

2. Dimethyldioctadecyl ammonium humate.
3. Laurylammonium humate.
4. Octadecylammonium humate.

References Cited by the Examiner

UNITED STATES PATENTS

| 2,783,222 | 2/1957 | Rahn | 260—515 |
| 2,850,492 | 9/1958 | Erskine et al. | 260—501 |
| 3,158,647 | 11/1964 | Myers | 260—501 |

FOREIGN PATENTS

| 143,399 | 12/1960 | U.S.S.R. |

LORRAINE A. WEINBERGER, *Primary Examiner.*

B. M. EISEN, M. WEBSTER, *Assistant Examiners.*